(12) United States Patent
Maeda

(10) Patent No.: US 9,376,110 B2
(45) Date of Patent: Jun. 28, 2016

(54) VEHICLE CONTROL APPARATUS

(71) Applicant: TOYOTA JIDOSHA KABUSHIKI KAISHA, Toyota-shi, Aichi-ken (JP)

(72) Inventor: Takashi Maeda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/634,066

(22) Filed: Feb. 27, 2015

(65) Prior Publication Data

US 2015/0307098 A1 Oct. 29, 2015

(30) Foreign Application Priority Data

Apr. 24, 2014 (JP) ................. 2014-090024

(51) Int. Cl.

| F16H 61/662 | (2006.01) |
|---|---|
| B60W 30/14 | (2006.01) |
| B60W 50/06 | (2006.01) |
| B60W 10/06 | (2006.01) |
| B60W 10/101 | (2012.01) |
| B60W 30/188 | (2012.01) |
| F02D 41/10 | (2006.01) |
| F02D 31/00 | (2006.01) |
| F16H 61/00 | (2006.01) |

(52) U.S. Cl.

CPC ............ *B60W 30/143* (2013.01); *B60W 10/06* (2013.01); *B60W 10/101* (2013.01); *B60W 30/188* (2013.01); *B60W 50/06* (2013.01); *F16H 61/66259* (2013.01); *B60W 2510/0638* (2013.01); *B60W 2540/10* (2013.01); *B60W 2710/0661* (2013.01); *B60W 2710/10* (2013.01); *B60W 2720/106* (2013.01); *F02D 31/001* (2013.01); *F02D 41/107* (2013.01); *F02D 2200/1012* (2013.01); *F02D 2200/50* (2013.01); *F02D 2200/602* (2013.01); *F02D 2250/18* (2013.01); *F16H 2061/0012* (2013.01)

(58) Field of Classification Search
None
See application file for complete search history.

(56) References Cited

U.S. PATENT DOCUMENTS

| 4,671,138 A * | 6/1987 | Nobumoto ............ B60W 10/06 474/12 |
|---|---|---|
| 4,976,170 A * | 12/1990 | Hayashi .................. F16H 61/66 477/43 |
| 5,282,400 A * | 2/1994 | Kobayashi ............ B60W 10/06 474/11 |
| 5,413,540 A * | 5/1995 | Streib ................... B60W 10/06 477/43 |
| 5,730,680 A * | 3/1998 | Toukura ............ F16H 61/66254 477/45 |
| 6,169,950 B1 | 1/2001 | Parigger |
| 6,442,467 B1 * | 8/2002 | Schuler ................. F16H 59/141 477/133 |
| 6,837,825 B2 * | 1/2005 | Nakayama ........ F16H 61/66259 477/48 |
| 6,896,640 B2 * | 5/2005 | Kurabayashi ........... F16H 59/20 477/46 |
| 7,270,622 B2 * | 9/2007 | Sporl ................... B60W 10/06 477/42 |

(Continued)

FOREIGN PATENT DOCUMENTS

| JP | 2001-227636 A | 8/2001 |
|---|---|---|
| JP | 2002-029286 A | 1/2002 |

(Continued)

*Primary Examiner* — Dirk Wright
(74) *Attorney, Agent, or Firm* — Oliff PLC

(57) ABSTRACT

A vehicle control apparatus is disclosed, which includes a processing device that calculates a target acceleration such that a vehicle speed of a vehicle, which includes a continuously variable transmission, becomes a target vehicle speed; sets a threshold for a change amount of an engine rpm based on the target acceleration; and controls the engine rpm such that the change amount of the engine rpm does not exceed the threshold.

10 Claims, 6 Drawing Sheets

(56) References Cited

U.S. PATENT DOCUMENTS 7,900,533 B2 * 3/2011 Shiiba ............... F16H 61/16
 701/52
2006/0014606 A1 1/2006 Sporl et al.

FOREIGN PATENT DOCUMENTS

| JP | 2008-030678 A | 2/2008 |
| JP | 2010-209983 A | 9/2010 |

* cited by examiner

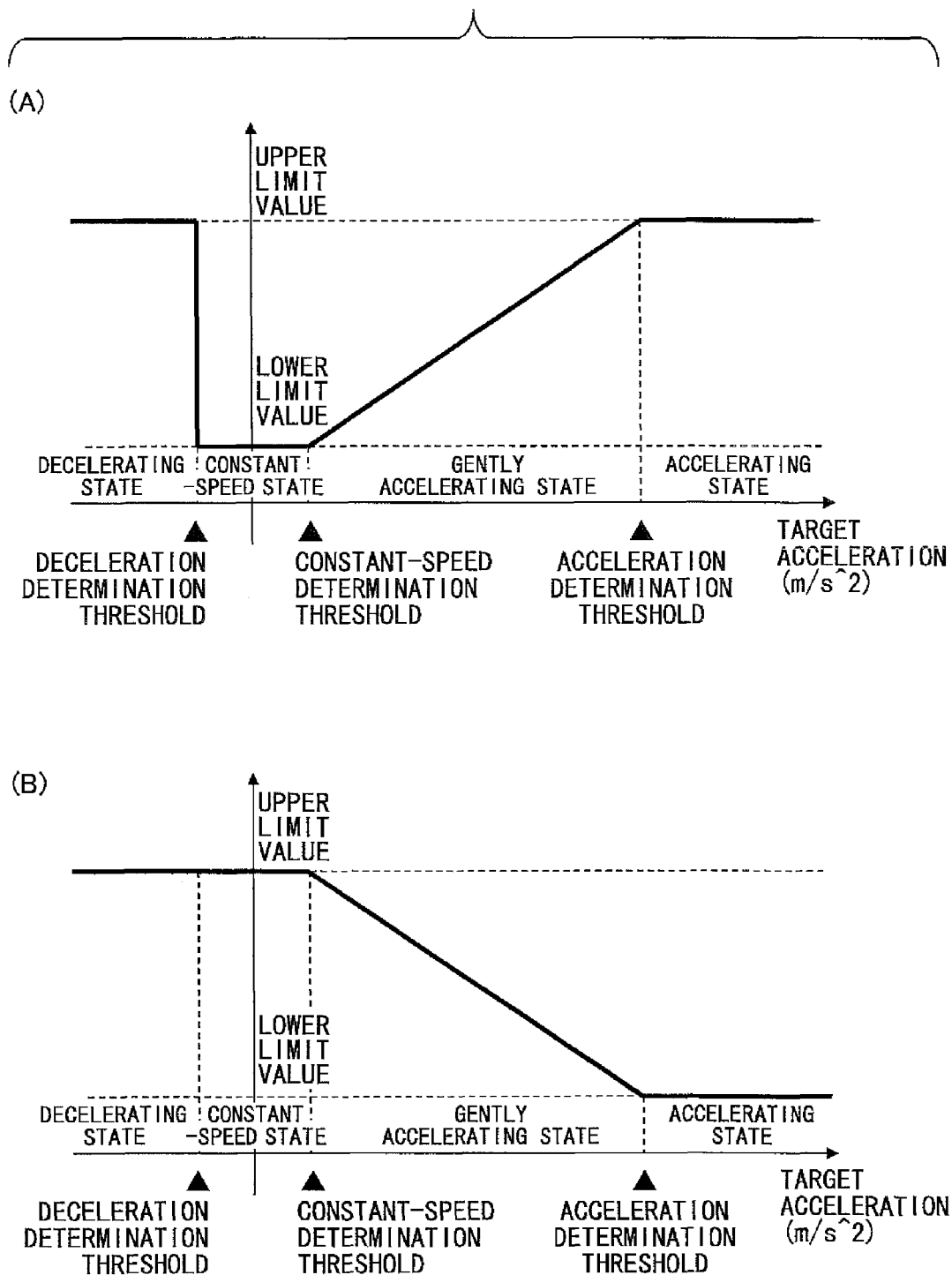

VEHICLE CONTROL APPARATUS

FIELD

The disclosure is related to a vehicle control apparatus.

BACKGROUND

Japanese Laid-open Patent Publication No. 2002-29286 discloses a control device for an internal combustion engine wherein the control device is provided with a continuously variable transmission, which continuously changes a transmission gear ratio of an output of the engine, and executes constant speed travel control of controlling an opening of a throttle valve so that a vehicle speed becomes a predetermined set vehicle speed.

With respect to a vehicle which includes a CVT (Continuously Variable Transmission), there is a case where a hunting phenomenon of the engine rpm (at a cycle of 5 s to 7 s, with an amplitude of about 100 rpm, for example) occurs when a target output driving force is slightly changed in control for keeping speed of the vehicle such as cruise control, etc. In the vehicle with the CVT, an electronic throttle as well as a transmission gear ratio of the CVT are used to control an output driving force of the vehicle. However, the electronic throttle and the CVT have delay factors in implementation systems thereof, and also different responsiveness. For this reason, if the driving force is controlled such that it increases, there is a case where the driving force is increased by the electronic throttle and then the driving force is increased by the transmission gear ratio with a delay, which causes the driving force to be too great. Then, in turn, the control for decreasing the driving force is performed, and this is repeated. Such repeated increase and the decrease in the transmission gear ratio causes the hunting phenomenon of the engine rpm.

Therefore, an object of the disclosure is to provide a vehicle control apparatus that can reduce a hunting phenomenon in a vehicle with a CVT.

SUMMARY

According to one aspect of the disclosure, a vehicle control apparatus is provided, which includes a processing device that calculates a target acceleration such that a vehicle speed of a vehicle, which includes a continuously variable transmission, becomes a target vehicle speed; sets a threshold for a change amount of an engine rpm based on the target acceleration; and controls the engine rpm such that the change amount of the engine rpm does not exceed the threshold.

BRIEF DESCRIPTION OF DRAWINGS

FIG. 6 is a diagram illustrating an example of a way of setting an engine rpm change amount guard according to a target acceleration.

DESCRIPTION OF EMBODIMENTS

In the following, embodiments are described in detail with reference to appended drawings.

Figure 1:
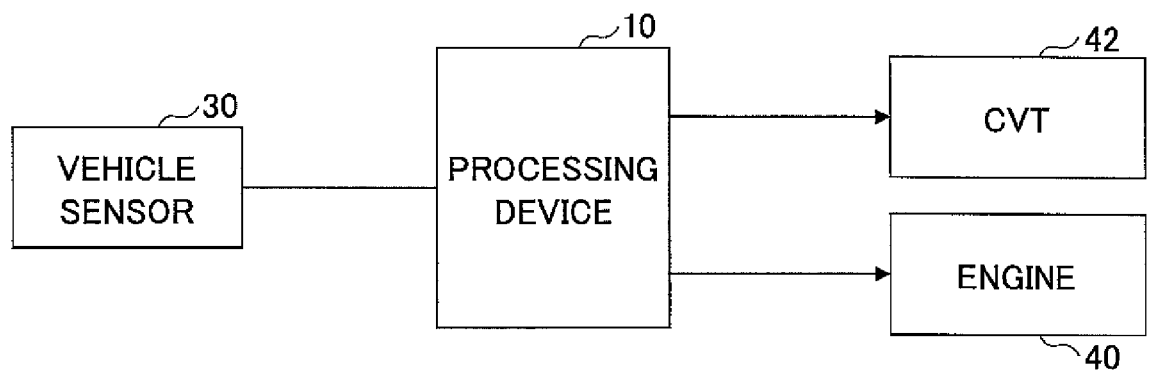
FIG. 1 is a diagram illustrating a vehicle configuration according to an example.

FIG. 1 is a diagram illustrating a vehicle configuration according to an example. A vehicle includes a processing device 10, a vehicle speed sensor 30, an engine 40 and a continuously variable transmission (CVT) 42. It is noted that connection ways between elements in FIG. 1 are arbitrary. For example, the connection ways may include a connection via a bus such as a CAN (controller area network), etc., an indirect connection via another ECU, etc., a direct connection, and a connection that enables wireless communication.

The processing device 10 may be configured with a processor including a CPU. The respective functions of the processing device 10 (including functions described hereinafter) may be implemented by any hardware, any software, any firmware or any combination thereof. For example, any part of or all the functions of the processing device 10 may be implemented by an ASIC (application-specific integrated circuit), a FPGA (Field Programmable Gate Array) or a DSP (digital signal processor). Further, the processing device 10 may be implemented by a plurality of processing devices (including processing devices in sensors).

The vehicle speed sensor 30 includes vehicle wheel speed sensors. The vehicle speed sensor 30 may be a sensor that detects information related to the vehicle speed, such as a sensor that detects a rpm of an output shaft of the continuously variable transmission 42, a GPS receiver, etc.

The processing device 10 is connected to the engine 40. The processing device 10 instructs a throttle position to an electronic throttle (not illustrated) of the engine 40.

The processing device 10 is connected to the continuously variable transmission 42. The processing device 10 instructs a transmission gear ratio to the continuously variable transmission 42.

Figure 2:
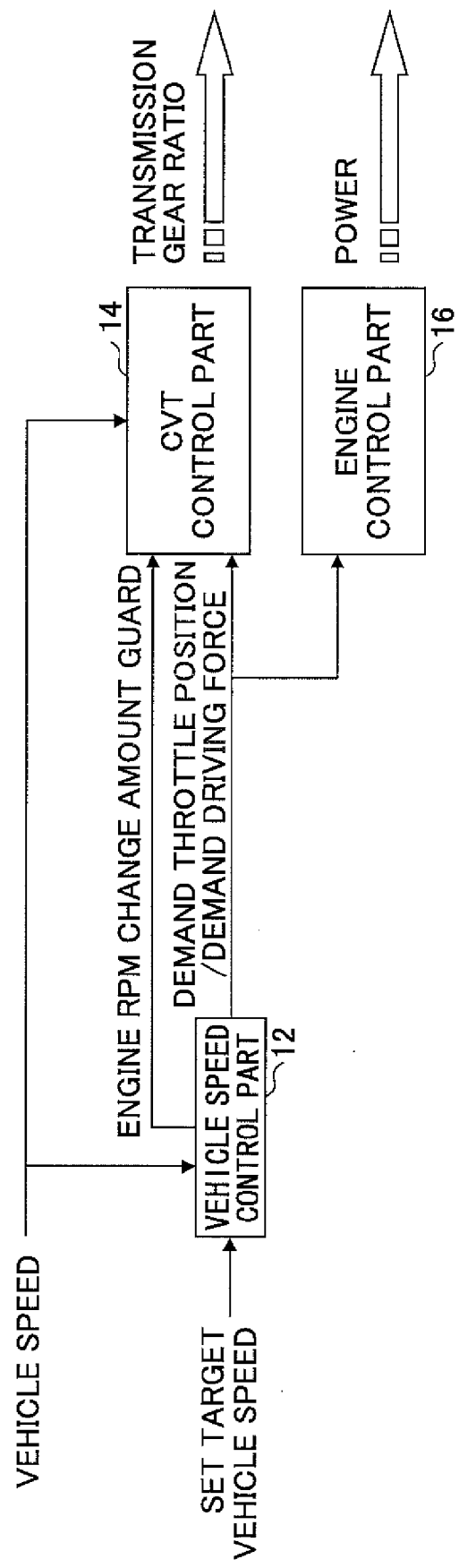
FIG. 2 is a diagram illustrating an example of a functional configuration of the processing device 10.

FIG. 2 is a diagram illustrating an example of a functional configuration of the processing device 10. The configuration illustrated in FIG. 2 is suited for performing cruise control.

The processing device 10 includes a vehicle speed control part 12, a CVT control part 14, and an engine control part 16.

The vehicle speed control part 12 obtains vehicle speed information input from the vehicle speed sensor 30. Further, the vehicle speed control part 12 obtains information representing a set target vehicle speed. The set target vehicle speed is a constant value, for example, which is set by a user such as a driver, etc. The set target vehicle speed may be a default value other than the vehicle speed set by the user. The vehicle speed control part 12 calculates a target acceleration based on a relationship between the vehicle speed and the set target vehicle speed, and then calculates a demand throttle position or a demand driving force based on the calculated target acceleration. Specifically, the vehicle speed control part 12 calculates the target acceleration such that the set target vehicle speed is implemented. For example, the vehicle speed control part 12 calculates the target acceleration such that a differential between the set target vehicle speed and the vehicle speed becomes 0. A PID (Proportional Integral Derivative Controller), etc., may be used for this feedback control. The demand throttle position or the demand driving force thus calculated is input to the CVT control part 14 and the engine control part 16.

The vehicle speed control part 12 calculates engine rpm change amount guards. The engine rpm change amount guard functions as a threshold for a change amount of the engine rpm. The change amount of the engine rpm may be a change amount per unit of time, or a change amount per a predetermined time (per a control cycle, for example). A way of calculating the engine rpm change amount guards is described hereinafter. Information representing the engine rpm change amount guards is input to the CVT control part 14.

The CVT control part 14 obtains information representing the demand throttle position or the demand driving force, and the engine rpm change amount guards input thereto. The CVT control part 14 determines a transmission gear ratio based on the demand throttle position or the demand driving force, the engine rpm change amount guards, etc. For example, the CVT control part 14 determines a target engine rpm based on the demand throttle position or the demand driving force, the current vehicle speed, the current engine rpm, etc. It is noted that the current vehicle speed corresponds to the current rpm of a driven wheel, and the current engine rpm corresponds to the current CVT input rpm (input shaft rpm). The CVT control part 14 determines the transmission gear ratio based on the relationship between the determined target engine rpm and the current CVT input rpm such that the change amount of the engine rpm does not exceed the engine rpm change amount guard. For example, the CVT control part 14 calculates a change rate (change speed) from the current transmission gear ratio to a transmission gear ratio for implementing the target engine rpm such that the change amount of the engine rpm does not exceed the engine rpm change amount guard due to the change in the transmission gear ratio, and then changes the transmission gear ratio according to the calculated change rate. It is noted that the target engine rpm can change at a calculation cycle, and thus the change rate of the transmission gear ratio may be changed accordingly. However, the target engine rpm may be subject to a "slowing operation", etc., for reducing a steep change thereof.

The engine control part 16 obtains information representing the demand throttle position or the demand driving force input thereto. The engine control part 16 determines a throttle position based on the demand throttle position or the demand driving force.

Figure 3:
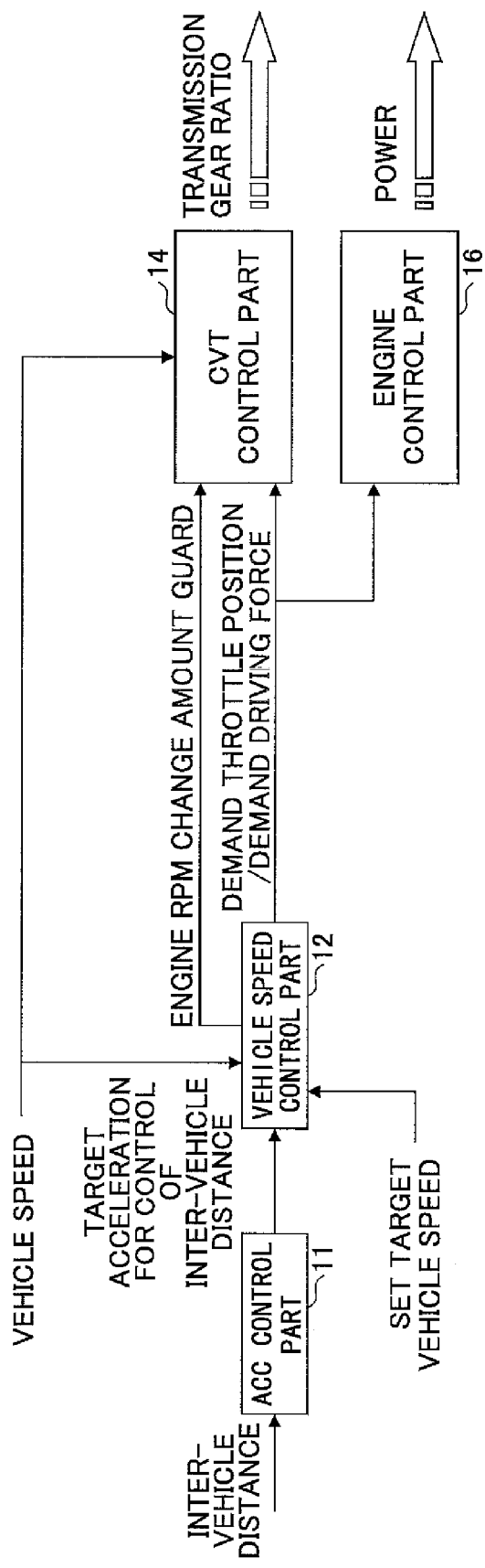
FIG. 3 is a diagram illustrating another example of a functional configuration of the processing device 10.

FIG. 3 is a diagram illustrating another example of a functional configuration of the processing device 10. The configuration illustrated in FIG. 3 is suited for performing ACC (Adaptive Cruise Control) or the like in addition to the cruise control.

The processing device 10 includes an ACC control part 11, the vehicle speed control part 12, the CVT control part 14, and the engine control part 16.

The ACC control part 11 obtains information representing an inter-vehicle distance with respect to a preceding vehicle. The information representing the inter-vehicle distance may be obtained with a radar sensor or an image sensor that monitors a scene in front of the vehicle, for example. The ACC control part 11 calculates a target acceleration based on the inter-vehicle distance and the vehicle speed information from the vehicle speed sensor 30, and outputs information representing the calculated target acceleration. It is noted that a way of calculating the target acceleration is arbitrary. For example, the calculation way used in ACC or the like may be used. For example, the target acceleration may be determined such that an inter-vehicle distance between the preceding vehicle and the host vehicle becomes a predetermined target inter-vehicle distance, or an inter-vehicle time (=inter-vehicle distance/vehicle speed) between the preceding vehicle and the host vehicle becomes a predetermined target inter-vehicle time. In the latter case, the target inter-vehicle time may be set on a vehicle speed basis (vehicle speed of the host vehicle).

The vehicle speed control part 12 calculates the demand throttle position or the demand driving force based on the target acceleration when the information representing the target acceleration is input from the ACC control part 11. Specifically, during the operation of the ACC, the vehicle speed control part 12 calculates the demand throttle position or the demand driving force based on the target acceleration from the ACC control part 11. On the other hand, during the operation of the cruise control, the vehicle speed control part 12 calculates the demand throttle position or the demand driving force based on the target acceleration that is calculated based on the relationship between the vehicle speed and the set target vehicle speed as described above.

The functions of the CVT control part 14 and the engine control part 16 may be the same as those explained with reference to FIG. 2.

Figure 4:
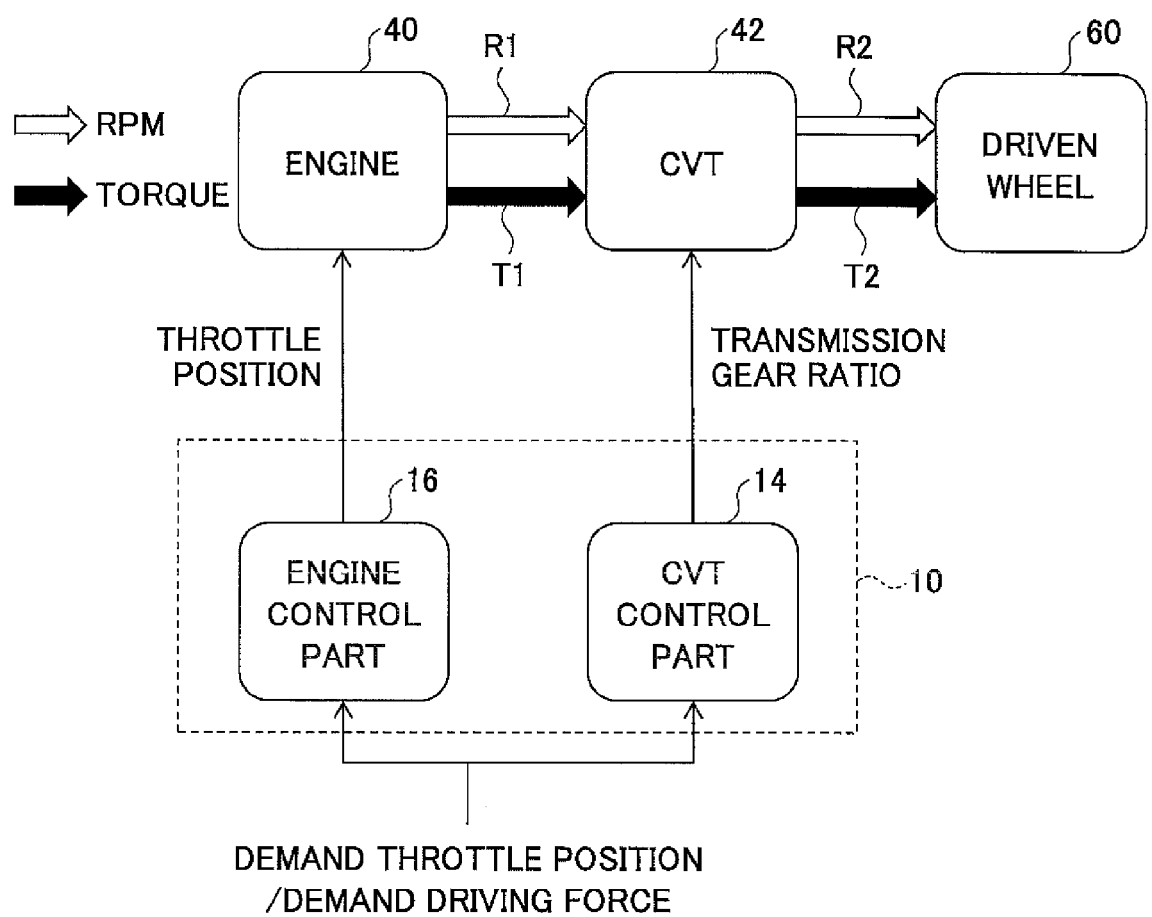
FIG. 4 is a diagram schematically illustrating a flow of power from an engine 40 to a driven wheel via a continuously variable transmission 42.

FIG. 4 is a diagram schematically illustrating a flow of power from the engine 40 to a driven wheel 60 via the continuously variable transmission 42. In FIG. 4, transmitted rpm is indicated by R1 and R2, and transmitted torque is indicated by T1 and T2.

According to the engine control by the engine control part 16, the determination is up to the torque level. Thus, the distribution (relation) between the rpm R1 and the torque T1 is not determined yet. The distribution between the rpm R1 and the torque T1 is determined when the transmission gear ratio is determined. In this case, the rpm R2 and the torque T2 converted by the continuously variable transmission 42 are transmitted to the driven wheel 60.

Figure 5:
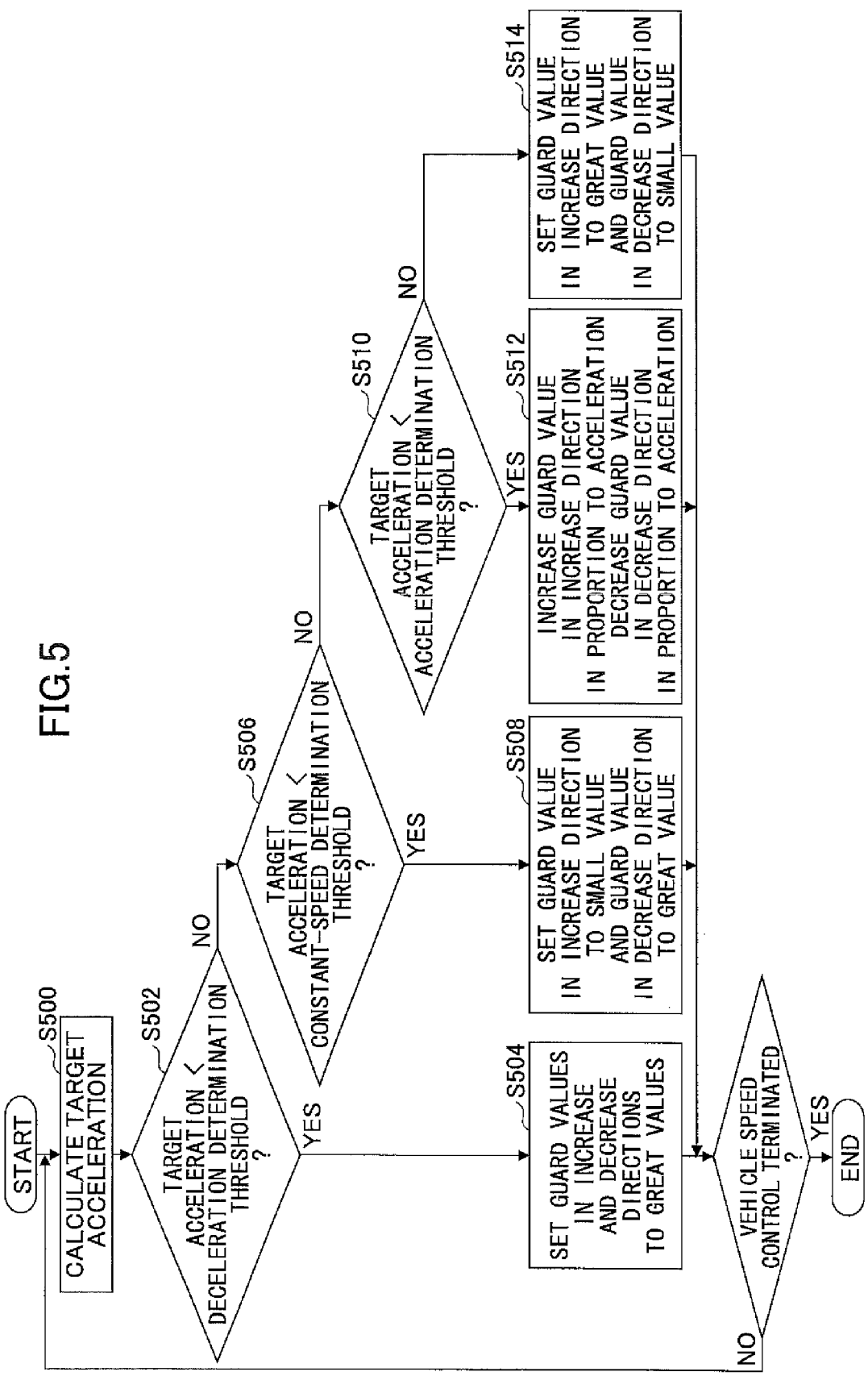
FIG. 5 is an example of a flowchart of a process executed by the vehicle speed control part 12.

FIG. 5 is an example of a flowchart of a process executed by the vehicle speed control part 12. FIG. 6 is a diagram illustrating an example of a way of setting the engine rpm change amount guards according to the target acceleration. In FIG. 6, (A) illustrates an example of the way of setting the engine rpm change amount guard in a direction in which the engine rpm increases, and (B) illustrates an example of the way of setting the engine rpm change amount guard in a direction in which the engine rpm decreases. In FIG. 6, a vertical axis represents the engine rpm change amount guard, and a horizontal axis represents the target acceleration. Further, in FIG. 6, it is assumed that the engine rpm change amount guard is "positive" even in the direction in which the engine rpm decreases. In other words, the comparison between the engine rpm change amount guard and the change amount of the engine rpm is performed with absolute values thereof. In the following, the engine rpm change amount guard in a direction in which the engine rpm increases is referred to as "an increase direction guard value", and the engine rpm change amount guard in a direction in which the engine rpm decreases is referred to as "a decrease direction guard value".

The process routine illustrated in FIG. 5 is performed at a predetermined cycle during the operation of the vehicle speed control such as the cruise control, the ACC, etc.

In step 500, the vehicle speed control part 12 calculates the target acceleration. The way of calculating the target acceleration may be such as described above.

In step S502, the vehicle speed control part 12 determines whether the target acceleration is less than a predetermined deceleration determination threshold. The deceleration determination threshold is the target acceleration that causes the decelerating state of the vehicle, and corresponds to an upper limit value of a range of the target acceleration that causes the decelerating state of the vehicle. The deceleration determination threshold may be less than 0, and may correspond to a lower limit value of a range of the target acceleration that causes a constant speed state (stably traveling state) of the vehicle, as illustrated in FIG. 6. If the target acceleration is less than the predetermined deceleration determination threshold, the process routine goes to step 504, otherwise the process routine goes to step 506.

In step S504, the vehicle speed control part 12 sets the increase direction guard value and the decrease direction guard value to values that are greater than those set in other states (the constant speed state, a gently accelerating state, an accelerating state). This is because it is useful to reduce constraint factors that can cause undesired increase of the speed as much as possible. For example, the increase direction guard value and the decrease direction guard value are set to their upper limit values (maximum values) as illustrated in FIG. 6. With this arrangement, the constraint against the change of the engine rpm in the increase direction and the decrease direction is minimized. It is noted that in the case where an engine brake is used during the decelerating state, for example, the engine rpm can increase during the decelerating state. The increase direction guard value set to the upper limit value is suited for such a configuration.

In step S506, the vehicle speed control part 12 determines whether the target acceleration is less than a predetermined constant-speed determination threshold. The constant-speed determination threshold is the target acceleration that causes the stably traveling state (constant speed state) of the vehicle, and corresponds to an upper limit value of a range of the target acceleration that causes the stably traveling state of the vehicle. The constant-speed determination threshold may be greater than 0, and may correspond to a lower limit value of a range of the target acceleration that causes the gently accelerating state of the vehicle, as illustrated in FIG. 6. If the target acceleration is less than the predetermined constant-speed determination threshold, the process routine goes to step 508, otherwise the process routine goes to step 510.

In step S508, the vehicle speed control part 12 sets the increase direction guard value to the small value and sets the decrease direction guard value to the great value. Accordingly, the change of the engine rpm in the decrease direction is promoted more than the change of the engine rpm in the increase direction. For example, during the operation of the cruise control, there may be a case where the driver presses the accelerator pedal to stop the operation of the cruise control (i.e., if an accelerator override event occurs), and then the driver releases the accelerator pedal to return to the operational state of the cruise control. This reduces a probability that a state in which the engine rpm does not drop immediately is formed after such a return to the operational state of the cruise control. In the example illustrated in FIG. 6, the increase direction guard value is set to the lower limit value (minimum value of the guard value), and the decrease direction guard value is set to the upper limit value as in the decelerating state. The minimum value of the guard value may be greater than 0, as illustrated in FIG. 6.

In step S510, the vehicle speed control part 12 determines whether the target acceleration is less than a predetermined acceleration determination threshold. The predetermined acceleration determination threshold is the target acceleration that causes the gently accelerating state of the vehicle, and corresponds to a lower limit value of a range of the target acceleration that causes the accelerating state of the vehicle, as illustrated in FIG. 6. If the target acceleration is less than the predetermined acceleration determination threshold, the process routine goes to step 512, otherwise the process routine goes to step 514.

In step S512, the vehicle speed control part 12 sets the increase direction guard value such that it gradually increases as the target acceleration increases, and sets the decrease direction guard value such that it gradually decreases as the target acceleration increases. This is because the gently accelerating state has a function of a bridge between the accelerating state and the stably traveling state, and thus it is useful to smoothly (without steep steps) change the increase direction guard value and the decrease direction guard value as much as possible. In the example illustrated in FIG. 6, the increase direction guard value increases from the lower limit value to the upper limit value in proportion to the target acceleration, and the decrease direction guard value decreases from the upper limit value to the lower limit value in proportion to the target acceleration. However, in a variant, the increase direction guard value increases from the lower limit value to the upper limit value in a non-linear manner with respect to the target acceleration, and the decrease direction guard value decreases from the upper limit value to the lower limit value in a non-linear manner with respect to the target acceleration. Alternatively, in another variant, the increase direction guard value may be an intermediate value between the lower limit value and the upper limit value, and/or the decrease direction guard value may be an intermediate value between the lower limit value and the upper limit value.

In step S514, the vehicle speed control part 12 sets the increase direction guard value to the great value and sets the decrease direction guard value to the small value. Accordingly, the change of the engine rpm in the increase direction is promoted more than the change of the engine rpm in the decrease direction. This is because it is useful to increase acceleration responsiveness in the accelerating state in which the acceleration is required. In the example illustrated in FIG. 6, the increase direction guard value is set to the upper limit value, and the decrease direction guard value is set to the lower limit value. With this arrangement, it becomes possible to suppress the deterioration of feeling of the engine rpm at the time of the acceleration, and enhance a vehicle speed keeping capability on a slope (gradient), in particular.

As described above, with respect to the vehicle which includes the CVT, a hunting phenomenon of the engine rpm tends to occur when the target output driving force is slightly changed in control for maintaining speed of the vehicle such as a cruise control, etc.

According to the embodiment, as described above, the engine rpm change amount guard is set, which prevents such a change of the engine rpm that otherwise exceeds the engine rpm change amount guard. Thus, the repeated increase and the decrease in the transmission gear ratio due to increase and the decrease in the driving force is suppressed, which can suppress the occurrence of a hunting phenomenon. Further, because the engine rpm change amount guard is set such that it varies according to the traveling state of the vehicle, it becomes possible to suppress a contradiction such as a delay of the rpm return after the accelerator override event, a deterioration of feeling of the engine rpm at the time of the acceleration, etc.

Further, according to the embodiment, as described above, because the engine rpm change amount guard is set, controllability become better with respect to a comparative configuration in which a change amount of the throttle position, for example, is guarded. Specifically, according to the comparative configuration, the change amount of the power of the engine 40 is suppressed when the guard function works, and thus the change amount of the engine rpm on a downstream side remains as it is after all. In other words, according to the comparative configuration, the control extends only up to the power of the engine 40 (see FIG. 4), and thus there is a probability that the hunting phenomenon of the engine rpm cannot be suppressed appropriately. In contrast, according to the embodiment, the change rate of the transmission gear ratio is suppressed when the engine rpm change amount guard function works, and thus the change amount of the engine rpm can be controlled with relatively high accuracy (without letting it run its course). Thus, according to the embodiment, the occurrence of the hunting phenomenon can be suppressed appropriately.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

For example, according to the embodiment described above, the increase direction guard value and the decrease direction guard value are used; however, only one of the increase direction guard value and the decrease direction guard value may be used, depending on the traveling state of the vehicle. For example, the increase direction guard value to be set to the upper limit value, and/or the decrease direction guard value to be set to the upper limit value may be omitted. For example, in the accelerating state, the increase direction guard value may be omitted, and thus only the decrease direction guard value may be applied.

Further, according to the embodiment described above, the process illustrated in FIG. 5 is performed during the operation of the vehicle speed control, such as the cruise control, the ACC, etc. However, the process illustrated in FIG. 5 may be performed during the operation of another vehicle speed control, such as ASL (Adjustable Speed Limiter), an ISA (Intelligent Speed Assistance), etc. According to the ASL, the vehicle speed is controlled such that the vehicle speed does not exceed a set vehicle speed that is set by the driver. According to the ISA, the set vehicle speed is set automatically based on limit speed information of a road sign which may be image-recognized using a vehicle-installed camera or the like.

The present application is based on Japanese Priority Application No. 2014-090024, filed on Apr. 24, 2014, the entire contents of which are hereby incorporated by reference.

What is claimed is:

1. A vehicle control apparatus comprising a processing device that calculates a target acceleration such that a vehicle speed of a vehicle, which includes a continuously variable transmission, becomes a target vehicle speed; sets a threshold for a change amount of an engine rpm based on the target acceleration; and controls the engine rpm such that the change amount of the engine rpm does not exceed the threshold.

2. The vehicle control apparatus of claim 1, wherein the threshold includes a first threshold for the change in a direction in which the engine rpm increases, and a second threshold for the change in a direction in which the engine rpm decreases.

3. The vehicle control apparatus of claim 2, wherein the processing device sets the first threshold such that the first threshold is greater than the second threshold, when the target acceleration represents an accelerating state of the vehicle.

4. The vehicle control apparatus of claim 2, wherein the processing device sets the first threshold such that the first threshold is smaller than the second threshold, when the target acceleration represents a stably traveling state of the vehicle in which the vehicle travels at a constant speed.

5. The vehicle control apparatus of claim 4, wherein the processing device sets the first threshold such that the first threshold in a case where the target acceleration represents a decelerating state of the vehicle is greater than the first threshold in a case where the target acceleration represents the stably traveling state of the vehicle.

6. The vehicle control apparatus of claim 4, wherein the processing device sets the first threshold and the second threshold such that the first threshold gradually increases and the second threshold gradually decreases, when the target acceleration increases from a value that represents the stably traveling state of the vehicle to a value that represents the accelerating state of the vehicle.

7. The vehicle control apparatus of claim 3, wherein the processing device sets the first threshold such that the first threshold is smaller than the second threshold, when the target acceleration represents a stably traveling state of the vehicle in which the vehicle travels at a constant speed.

8. The vehicle control apparatus of claim 7, wherein the processing device sets the first threshold such that the first threshold in a case where the target acceleration represents a decelerating state of the vehicle is greater than the first threshold in a case where the target acceleration represents the stably traveling state of the vehicle.

9. The vehicle control apparatus of claim 7, wherein the processing device sets the first threshold and the second threshold such that the first threshold gradually increases and the second threshold gradually decreases, when the target acceleration increases from a value that represents the stably traveling state of the vehicle to a value that represents the accelerating state of the vehicle.

10. The vehicle control apparatus of claim 1, wherein the processing device calculates a target engine rpm based on the target acceleration, and adjusts a change rate from a current transmission gear ratio of the continuously variable transmission to a transmission gear ratio for implementing the target engine rpm such that the change amount of the engine rpm does not exceed the threshold.

* * * * *